INVENTORS
George L. Crook
Alfred H. Read
BY Townsend & Muerrle
ATTORNEYS

INVENTORS
George L. Crook
Alfred H. Read
BY Townshend & Meserole
ATTORNEYS

United States Patent Office 3,510,064
Patented May 5, 1970

3,510,064
OXY-FUEL FLAME BURNER NOZZLES
George L. Crook, Harrow, and Alfred H. Read, Barkingside, England, assignors to The British Oxygen Company Limited, a British company
Filed Oct. 24, 1967, Ser. No. 677,562
Claims priority, application Great Britain, Oct. 26, 1966, 47,953/66; July 26, 1967, 34,249/67
Int. Cl. B05b 7/06
U.S. Cl. 239—424                    5 Claims

ABSTRACT OF THE DISCLOSURE

A two-part nozzle for an oxy-fuel flame burner comprises two hollow members which nest together and which define between them several divergent passages for the oxy-fuel gas mixture. The passages are of constant depth and communicate at their narrow ends with separate inlets, and at their wide ends with outlets.

Related prior art

This invention is a modification of, or improvement in, the invention described in U.K. patent specification No. 1,023,354.

Summary of the invention

Manufacture is simplified, with at least equal mixing efficiency, by making the divergent passages of constant depth.

Accordingly the present invention provides an oxy-fuel flame burner nozzle which in its broadest aspect is as defined in claim 1 of the appended claims.

The present invention will now be described by way of example with reference to the accompanying drawings, in which.

Figure 1:
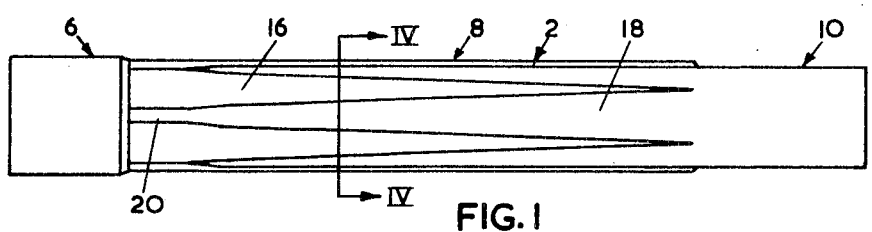
FIG. 1 is a side view of the inner member of one example of a two-part nozzle of the present invention, in an intermediate stage of fabrication.

As shown in the drawings, the inner member 2 of the nozzle 4 is of substantially cylindrical form and is shaped by a chipless machining process which does not form part of the subject matter of this invention. The inner member comprises a head portion 6; a body 8, and a tip 10.

Figure 2:
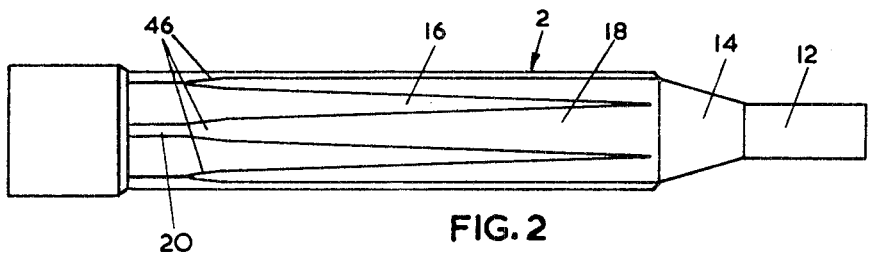
FIG. 2 is a view of the inner member shown in FIG. 1 in a later stage of fabrication.

In the final form of the nozzle, the tip 10 is of reduced diameter, as shown at 12 in FIG. 2, the reduced portion 12 being connected to the body by an intermediate portion 14.

The body has a series of substantially triangular lands 16 defining between them passages 18 which diverge from the head portion of the inner member towards the tip.

As its narrower end each passage 18, has a parallel-sided inlet 20. When the nozzle 2 is mounted in position in an associated holder (not shown) the passages 20 are placed in communication with a peripheral chamber, or "manifold," to which oxygen is fed, the chamber being in communication with the passages 20.

The tip end of the nozzle is provided with a series of parallel slots 22 in the outside surface of the tip 12 and of the intermediate portion 14. These slots 22 are in communication with the wider end of the passages 18. Thus when the outer member 24 of the nozzle (shown in FIGS. 6 to 8) is in position on the inner member these slots 22 provide the only passages by which the mixture of oxygen and fuel gas can flow from the passages 18 to the outlet orifices of the nozzle. As shown most clearly in FIG. 6, these slots preferably run axially from the nozzle end of the inner member until they extend into the base of the passages 18. These slots are spaced uniformly around the periphery of the tip and intermediate portion and as illustrated, number two for each passage.

Figure 4:
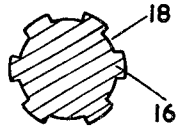
FIG. 4 is a section on the line IV—IV of FIG. 1.

It will be seen from FIG. 4 that the side walls of the lands 16 are substantially radial in cross-section. Thus these walls are in effect helical.

Figure 3:
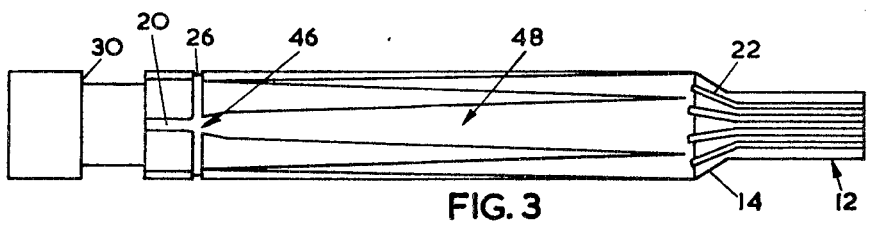
FIG. 3 is a view similar to FIGS. 1 and 2 but showing the inner member in its nearly-final form.
Figure 6:
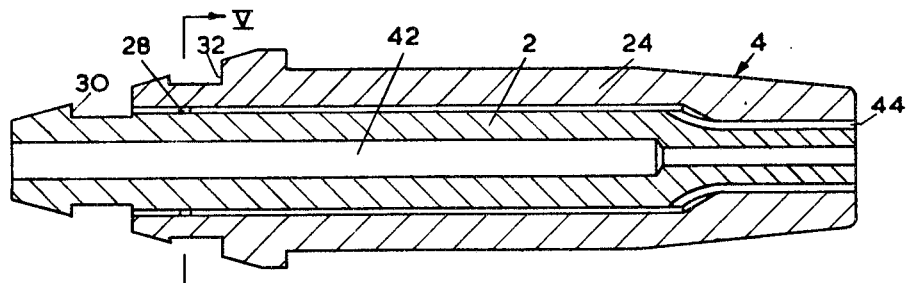
FIG. 6 is an axial section on the line VI—VI of FIG. 5.

In that form of nozzle shown in FIGS. 3 and 6, the main divergent diffuser portion 48 of each passage 18 is connected to the nearer end of its inlet passage 20 by means of a short axial portion 46 of greater divergency. This portion 46 is called the mixer portion because it is in this portion that fuel gas is mixed with the oxygen flowing along passage 18. The mixer portions 46 are interconnected by a peripheral groove 26 which acts as a manifold for the fuel gas. Fuel gas is introduced into the groove 26 through radial passages 28 in the outer member 24 of the nozzle.

In this form of nozzle, the end of passage 20 which is remote from the tip 10 is in communication with a wide peripheral groove 30 in the inner member. When the inner and outer members are assembled together and mounted in a frusto-conical recess in the holder (not shown) the groove 30 and the adjacent face of the outer member 24 define with the holder a manifold chamber which is connected to a source of oxygen under pressure.

As shown in FIG. 6, the radial passages 28 in the outer member 24 are in communication at the outer end with a groove 32 which is similarly adapted to cooperate with the holder to define a manifold chamber into which fuel gas under pressure is introduced.

The inner and outer members are secured together against relative rotation in a final position in which the passages 28 communicate with the groove 26 at locations intermediate the adjacent passages 18. Fuel gas entering through the passages 28 is forced to bifurcate where it meets the groove 26 and thus fuel gas enters each passage 18 on both sides, thus ensuring a more-efficient mixing action than if the fuel gas were introduced directly into the oxygen stream by means of the radial passages 28.

Figure 7:
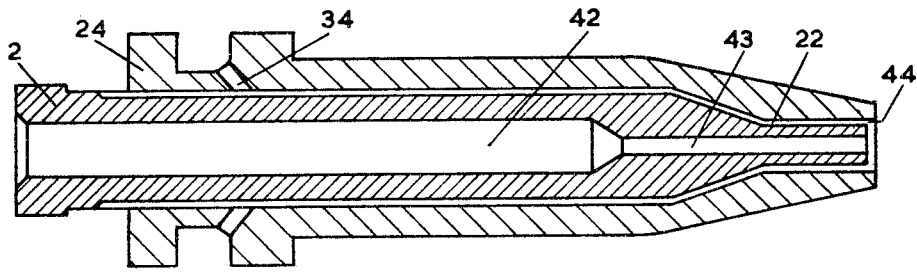
FIG. 7 is an axial section of a second form of nozzle of the present invention.
Figure 8:
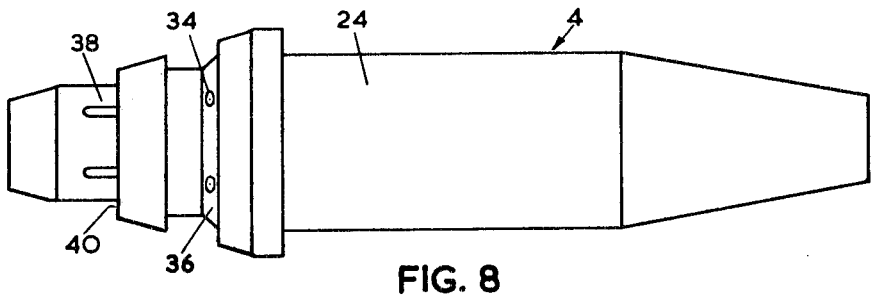
FIG. 8 is a side view of the nozzle shown in FIG. 7 in its final form.

In that form of the invention shown in FIGS. 7 and 8, there is no manifold groove 26, and the passages 34 through which fuel gas is introduced into the passages 18 are not normal to the axis but are oblique to it, as shown most clearly in FIG. 7. These passages 34 are drilled through a frusto-conical face 36 which is perpendicular to the axes of the passages 34 for ease of drilling.

Another difference from the first example of nozzle is that the inlet passages 20 extend axially for such a length that when the inner and outer members of the nozzle are assembled together they lie in that portion of the outer surface of the inner member which projects beyond the outer member. In like manner to the first form of nozzle, when the nozzle shown in FIG. 8 is inserted into a frusto-conical recess in a holder (not shown) the outer surface 38 of the inner member and the end face 40 of the outer member define with the holder a manifold chamber into which oxygen is introduced.

In both forms of nozzle illustrated, as shown in FIGS. 6 and 7, a central stepped axial passage 42 is provided. The larger end of this passage is connected through a valve to a source of oxygen under pressure when the nozzle is mounted in its holder, in order that the nozzle can be used for cutting metal. When so used, the metal to be cut is pre-heated by means of the oxy-fuel flame issuing from the orifices 44 defined between the inner and outer members by the respective ends of the slots 22 in the inner member. When hot enough, a stream of high purity oxygen is caused to emerge from the narrower end 43 of passage 42 and this reacts exothermically with the metal to melt the metal and to blow the molten metal and slag from the workpiece being cut.

As described above, the walls of the inlet portion 20 are parallel. The walls of the mixer portion 46 define between them an angle which can be as high as 60° for petroleum gases such as propane, but which for acetylene must not exceed 15°.

The walls of the diffuser portion 48 diverge at a smaller angle which must not exceed 7° for acetylene. These upper limits for acetylene are necessary to ensure that an oxy-acetylene mixture will not burn-back under normal conditions of use.

Figure 5:
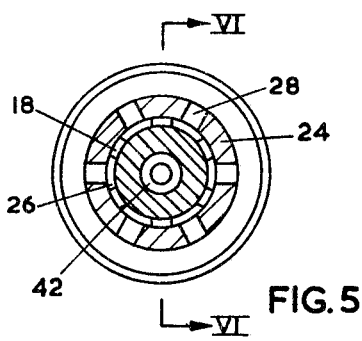
FIG. 5 is a sectional view of two-part nozzle incorporating the inner member shown in FIGS. 1 to 3.

That cross-section of the first example of nozzle, as shown in FIG. 5, shows how the fuel gas inlet passages 28 are disposed relatively to the passages 18 where both intersect the groove 26.

It will thus be seen that the present invention provides a two-part oxy-fuel burner nozzle of simple construction yet which provides efficient mixing of the oxygen and fuel gas without fear of the gas mixture burning-back when ignited.

What we claim is:

1. An oxy-fuel flame burner nozzle, comprising an inner longitudinally-extending member cooperating with an outer member of annular cross-section, the two members defining between them a plurality of angularly-spaced passages of substantially constant depth which diverge longitudinally from the inlet end of the nozzle, each passage being in communication at its narrower end with separate inlets for the oxygen and fuel gas, and at its wider end with at least one outlet orifice defined by the inner and outer members, the inner member being shaped by a chipless machining process.

2. An oxy-fuel flame burner nozzle, comprising an inner longitudinally-extending member cooperating with an outer member of annular cross-section, the two members defining between them a plurality of angularly-spaced passages of substantially constant depth which diverge longitudinally from the inlet end of the nozzle, in which the narrower ends of the passages are in communication with each other by means of a common peripheral groove which is in communication with the exterior of the outer member through substantially-radial first inlet passages, and in which the narrower end of each passage is also in communication with a second inlet, the wider end of each passage being in communication with at least one outlet orifice defined between the inner and outer members, the inner member being shaped by a chipless machining process.

3. The nozzle claimed in claim 2, in which each passage in the inner member has three contiguous portions—an inlet portion with substantially parallel walls, a mixer portion of short length with widely-divergent walls, and a diffuser portion with walls which diverge less widely, and in which the or each respective inlet for fuel gas communicates with the mixer portion of its respective passage.

4. The nozzle claimed in claim 1, having at its inlet end at least three frusto-conical surfaces which are spaced axially apart, and which taper towards the inlet of the nozzle, the surfaces being each of a mean diameter progressively greater from the inlet end of the nozzle towards its outlet end and being separated axially by peripheral grooves forming peripheral manifold chambers of which that groove between the smallest and the median frusto-conical surfaces is in direct communication with the narrow ends of the divergent passages, and of which the groove between the median and the largest frusto-conical surfaces is in communication with the passages intermediate their ends, the inner member being shaped by a chipless machining process.

5. The nozzle claimed in claim 4, in which the inner member has in it an axial passage of stepped diameter, the narrower portion ending in the end face of the inner member adjacent to the outlet orifices.

References Cited

UNITED STATES PATENTS

| | | | |
|---|---|---|---|
| 1,809,652 | 6/1931 | Vincent | 239—424.5 X |
| 2,378,346 | 6/1945 | Wigton | 239—424.5 X |
| 2,897,884 | 8/1959 | Fee | 239—424.5 |

FOREIGN PATENTS 520,205   6/1953   Belgium.

M. HENSON WOOD, Jr., Primary Examiner

M. Y. MAR, Assistant Examiner

U.S. Cl. X.R.

239—427.3; 431—354